April 6, 1937.  A. J. TEIGELER  2,075,964

RUBBER GROOMING DEVICE

Filed April 27, 1935

Alfred J. Teigeler INVENTOR.

BY Joseph F. O'Brien ATTORNEY.

Patented Apr. 6, 1937

2,075,964

UNITED STATES PATENT OFFICE 2,075,964

RUBBER GROOMING DEVICE

Alfred J. Teigeler, Rutherford, N. J.

Application April 27, 1935, Serial No. 18,629

2 Claims. (Cl. 15—127)

This invention relates to improvements in rubber grooming devices.

One of the objects of my invention is to provide a readily mountable water-spraying connection for a grooming device for dogs and other animals and particularly for a curry comb having a back or body portion and a series of projecting toothed flanges formed completely of resilient rubber by utilizing a metallic spraying head of suitable configuration insertable from the open side of the device into a depression formed in the bottom side of the back and locked therein by providing a laterally-extending locking groove in the rubber above the said depression, and to also provide a water connection or nipple for said spraying head extending through the rubber back or body of the curry comb that will position the head in place and provide a ready and easy means for connecting the device with a water-supplying hose.

Still another object of my invention is to provide at the center of a substantially elliptical rubber curry-comb a seat and locking means for a semi-spherical metallic water-spraying head having a laterally extending perimetric flange, said seat and locking means comprising a depression in the rubber back of the curry comb of substantially semi-spherical conformation and a cylindrical toothed rim or flange merging at its base with the edge of said depression, and having between said rim flange and depression a groove extending laterally and engageable with the perimetric flange of the spraying head.

Still another object of my invention is to provide in the wall of the depression a central aperture adapted to permit the passage therethrough of the nozzle of the spraying head so as to enable connection of a water hose to said nozzle.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawing, in which:—

Figure 1:
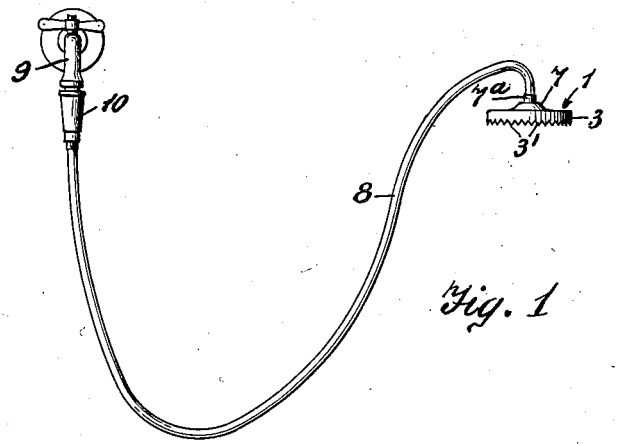
Fig. 1 is a side view in side elevation of a curry comb embodying my invention connected by a hose to a hydrant.
Figure 2:
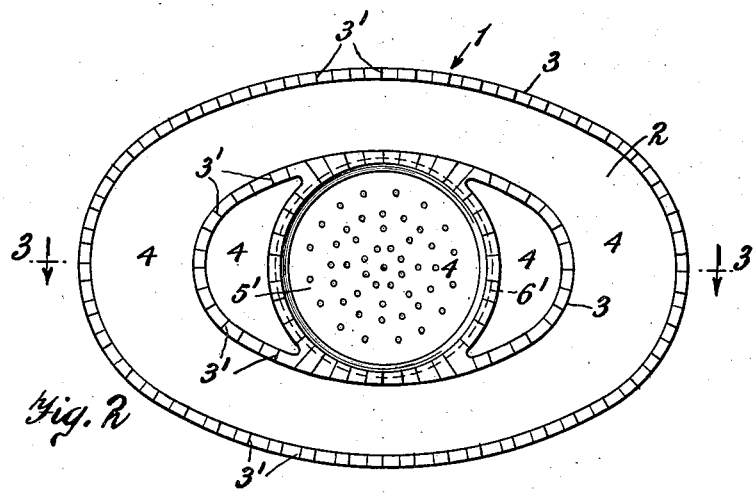
Fig. 2 is a bottom view of the curry comb shown in Fig. 1.
Figure 3:
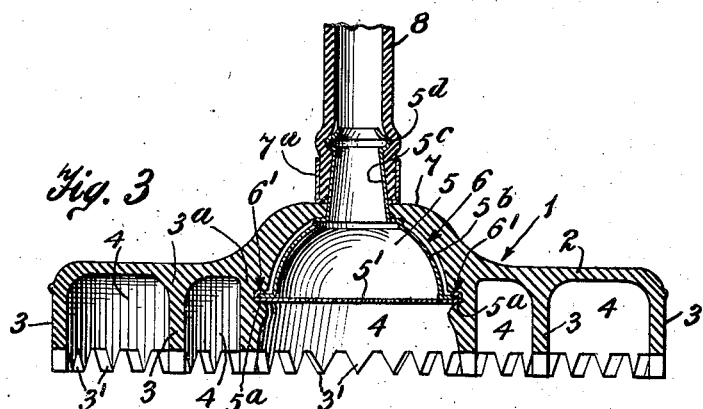
Fig. 3 is a section on the line 3—3 of Fig. 1, looking in the direction of the arrows.

Referring now to the drawing 1 indicates a grooming device comprising a curry comb particularly adapted for washing and grooming dogs and other animals. The curry comb 1 is completely formed of relatively stiff though resilient rubber and as illustrated is elliptical in conformation embodying a rubber back 2 having formed integrally therewith a plurality of grooming members comprising continuous flanges 3 projecting outwardly at substantially right angles to the back and each provided with teeth 3' for rubbing over the hair and skin of a dog or other animal to wash and clean the skin and hair or fur and to comb the latter.

The continuous resilient rubber flanges 3 merge at their bases 3ª with the back 2 to provide a series of interflange spaces 4, and while it would be possible to use any of these interflange spaces in order to seat a water-spraying head, I preferably provide in the curry comb a centrally-positioned cylindrical flange having a cylindrical interflange space in order to provide for the seating therein of a standard semi-spherical water-spraying head, thus greatly reducing the cost of the metallic spraying heads necessarily employed, providing a guard which will guide the spray water directly to the place required and will prevent splashing or excessive spreading of such spray water, and will also enable a facile, neat, sanitary and simple method of mounting and fastening such spraying heads to the curry comb. In the embodiment shown, therefore, I utilize a central space 4 surrounded by a cylindrical flange 3 within which to seat a metallic water-spraying head 5, and for this purpose I provide within the confines or wall of the flange 3 a semi-spherical seat 6 in the rubber of the device which is preferably formed by providing a hump 7 on the outer surface of said back and utilizing the interior of this hump 7 to form said spherical seat 6. Said hump 7 opens into or communicates with the axial space within said cylindrical flange, the wall of said semi-spherical depression merging with the base of said flange so as to permit the passage through said space of the said semi-spherical head. The inside diameter of the outer edge of the cylindrical flange is preferably made slightly larger than the diameter of the substantially circular spray-plate 5' of the spraying head 5 and tapers toward the base thereof and said spray-plate 5' has a perimetric flange 5ª extending laterally a slight distance beyond the wall of a spray head body 5ᵇ, and a laterally-extending perimetric groove 6' is formed at the entrance of said seat and between the body of the cylindrical flange 3 and the semi-spherical seat 6 into which the flange 5ᵃ is adapted to engage and with which said flange interlocks.

The depth of the depression for the seat 6 is reduced by extending the same outwardly beyond the inner surface of the bottom of the back and forming said locking groove above said inner surface of the back in the wall of said flange.

The rubber of the base of said cylindrical flange adjacent to said locking groove is thickened to provide a tapered or inclined sliding surface against which said head is pushed on insertion so as to cause the flange of the head to snap into said groove and produce a secure locking engagement therewith.

The bottom of the depressed seat 6 is provided with a centrally disposed aperture through which projects a nipple 5ᶜ attached to the said spraying head 5 and means such as the ridge 5ᵈ and ferrule 7 are provided on the outer side of the nipple for forming a connection with a hose 8 connected as shown to a faucet 9 by a suitable faucet connection 10.

Having described my invention, I claim:

1. A grooming device embodying, in combination, a back member of resilient rubber, a cylindrical flange member of similar resilient material formed integrally with said back member and having a body portion projecting outwardly from said back at substantially right angles and a free outer edge, said grooming device having a semi-spherical seat portion for a spraying head disposed between the inner end of said resilient rubber flange and the bottom of said resilient back member and provided with an entrance surrounded by said flange and a locking groove positioned between said seat portion and the body portion of said flange, and a semi-spherical metallic spraying head removably seated into said seat portion and having a perimetric flange adapted to snap into said locking groove and to be locked in said seat by the resilience of the rubber, and means for connecting said spraying head with a water supply.

2. A grooming device embodying, in combination, a back member of resilient rubber, a cylindrical flange member of similar resilient material formed integrally with said back member and having a body portion projecting outwardly from said back at substantially right angles and a free outer edge, said grooming device having a semi-spherical seat portion for a spraying head disposed between the inner end of said resilient rubber flange and the bottom of said resilient back member and provided with an axial orifice extending through said back member and with an entrance surrounded by said flange and a locking groove positioned between said seat portion and the body portion of said flange, and a semi-spherical metallic spraying head removably seated into said seat portion and having a perimetric flange adapted to snap into said locking groove and to be locked in said seat by the resilience of the rubber, and also provided with an axially disposed nipple passing through said axial orifice and means for connecting said nipple with a water supply.

ALFRED J. TEIGELER.